United States Patent
Hashimoto et al.

(10) Patent No.: US 12,348,119 B2
(45) Date of Patent: *Jul. 1, 2025

(54) SERIES CAPACITOR STEP-DOWN CONVERTER, AND CONTROLLER CIRCUIT AND CONTROL METHOD THEREOF

(71) Applicant: ROHM Co., LTD., Kyoto (JP)

(72) Inventors: Kazuki Hashimoto, Kyoto (JP); Akihiro Kawano, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 77 days.

This patent is subject to a terminal disclaimer.

(21) Appl. No.: 18/350,243

(22) Filed: Jul. 11, 2023

(65) Prior Publication Data
US 2024/0022159 A1    Jan. 18, 2024

(30) Foreign Application Priority Data
Jul. 13, 2022    (JP) .................................. 2022-112743

(51) Int. Cl.
*H02M 3/07*    (2006.01)
*H02M 1/00*    (2006.01)
(Continued)

(52) U.S. Cl.
CPC ....... *H02M 1/0029* (2021.05); *H02M 1/0043* (2021.05); *H02M 1/084* (2013.01);
(Continued)

(58) Field of Classification Search
CPC .. H02M 1/0029; H02M 1/0043; H02M 1/009; H02M 1/0095; H02M 1/08;
(Continued)

(56) References Cited

U.S. PATENT DOCUMENTS

| 11,329,546 B2 * | 5/2022 | Nosaka | ................. H02M 3/015 |
| 2015/0162840 A1 * | 6/2015 | Frost | ................. H02M 3/33573 |
| | | | 363/21.02 |

(Continued)

FOREIGN PATENT DOCUMENTS

| CN | 113726167 A | * 11/2021 |
| JP | 2017147893 A | * 8/2017 |

OTHER PUBLICATIONS

Stefano Saggini; Shuai Jiang; Mario Ursino; Chenhao Nan; "A 99% Efficient Dual-Phase Resonant Switched-Capacitor-Buck Converter for 48 V Data Center Bus Conversions"; May 27, 2019; IEEE; 2019 IEEE Applied Power Electronics Conference and Exposition (APEC) (Year: 2019).*

(Continued)

*Primary Examiner* — Thienvu V Tran
*Assistant Examiner* — Shahzeb K Ahmad
(74) *Attorney, Agent, or Firm* — CHIP LAW GROUP (57) ABSTRACT

Provided is a controller circuit for a series capacitor step-down converter that drives the series capacitor step-down converter at a switching frequency $f_{sw}$ higher than a frequency $f_0$ represented by the following Equation

[Math. 1]

$$f_0 = \frac{1}{2\pi}\sqrt{\frac{L}{C_r(L^2 - M^2)}} \qquad (1)$$

wherein L is a design value for an inductance value of at least two inductors constituting a coupled inductor of the series capacitor step-down converter, M is a design value for (Continued)

a mutual inductance of the at least two inductors, and $C_r$ is a design value of a capacitance of a series capacitor.

8 Claims, 9 Drawing Sheets

(51) Int. Cl.
*H02M 1/084* (2006.01)
*H02M 3/158* (2006.01)
*H02M 1/38* (2007.01)

(52) U.S. Cl.
CPC ............ *H02M 3/07* (2013.01); *H02M 3/072* (2021.05); *H02M 3/1586* (2021.05); *H02M 1/0095* (2021.05); *H02M 1/38* (2013.01); *H02M 3/158* (2013.01)

(58) Field of Classification Search
CPC .......... H02M 1/084; H02M 1/38; H02M 3/07; H02M 3/071; H02M 3/072; H02M 3/077; H02M 3/156; H02M 3/158; H02M 3/1584; H02M 3/1586
See application file for complete search history.

(56) References Cited

U.S. PATENT DOCUMENTS

| 2018/0041120 A1* | 2/2018 | Chen ...................... H02M 3/07 |
| 2021/0288581 A1* | 9/2021 | Zhu ........................ H02M 3/07 |
| 2022/0247303 A1* | 8/2022 | Jin ...................... H02M 3/1584 |

OTHER PUBLICATIONS

Stefano Saggini, Shuai Jiang, Mario Ursino, Chenhao Nan, 'A 99% Efficient Dual-Phase Resonant SwitchedCapacitor-Buck Converter for 48 V Data Center Bus Conversions,' 2019 IEEE Applied Power Electronics Conference and Exposition (APEC). https://www.semanticscholar.org/paper/A-99-Efficient-Dual-Phase-Resonant-Converter-for-48-SagginiJiang/5a7627a49f99c71b67007a8df1eff7b8a766f22b.

* cited by examiner

SERIES CAPACITOR STEP-DOWN CONVERTER, AND CONTROLLER CIRCUIT AND CONTROL METHOD THEREOF

CROSS REFERENCE TO RELATED APPLICATIONS

This application claims priority benefit of Japanese Patent Application No. JP 2022-112743 filed in the Japan Patent Office on Jul. 13, 2022. Each of the above-referenced applications is hereby incorporated herein by reference in its entirety.

BACKGROUND

The present disclosure relates to series capacitor converters.

A direct current to direct current (DC/DC) converter with a step-down function is used to generate a voltage lower than an input voltage. A step-down (Buck) type, a step-up/step-down type, a Cuk type, a Zeta type, a Sepic type, etc. are known as a DC/DC converter having a step-down function.

Depending on the application, an interleaved type or a series capacitor type, which is variations of the step-down converter, is adopted. In the interleaved type, buck converters are connected in parallel, and their inputs and outputs are connected in common. High efficiency operation is achieved by the interleaved operation of a plurality of buck converters. The interleaved type has the same step-down ratio as a normal buck converter.

A series capacitor type step-down converter can be thought of as a modification of an interleaved type with a phase number of 2 and has a configuration with an added series capacitor. The step-down converter of the series capacitor type can reduce the step-down ratio to half of the ratio of the interleaved type, and thus is suitable for applications that require a small step-down ratio.

An example of the related art is disclosed in "Stefano Saggini, Shuai Jiang, Mario Ursino, Chenhao Nan, 'A 99% Efficient Dual-Phase Resonant Switched-Capacitor-Buck Converter for 48 V Data Center Bus Conversions,' 2019 IEEE Applied Power Electronics Conference and Exposition (APEC)."

DETAILED DESCRIPTION (Overview of Embodiment)

An overview of some exemplary embodiments of the present disclosure will be provided. This overview presents some concepts of one or more embodiments in simplified form as a preamble to the more detailed description that is presented later, for the purpose of providing a basic understanding of the embodiments, and does not limit the scope of the disclosure. This overview is not a comprehensive overview of all thinkable embodiments, and it is intended to neither specify key elements of all embodiments nor delineate the scope of some or all aspects. For convenience, the term "an embodiment" may be used to refer to one embodiment (example or modification) or a plurality of embodiments (examples or modifications) disclosed in the present specification.

In a controller circuit for a series capacitor step-down converter according to an embodiment, when two inductors constituting a coupled inductor of the series capacitor step-down converter have an inductance design value of L, the mutual inductance design value of the two inductors is M, and the design value of the capacitance of the series capacitor is Cr, the series capacitor step-down converter is driven at the switching frequency $f_{sw}$ higher than a frequency $f_0$ represented by Equation (1).

In series capacitor step-down converters in the past, the switching frequency is defined so as to be equal to the resonant frequency. Therefore, if the resonance frequency shifts due to variations in circuit constants, parasitic inductance, parasitic capacitance, etc., conditions for zero voltage switching (ZVS) may not be satisfied depending on the direction of the shift, and a problem arises that loss increases or an overvoltage is applied to the switching element.

According to the above configuration, by setting the switching frequency higher than the resonance frequency, the ZVS conditions can be satisfied even when the circuit constant varies. As a result, the power conversion efficiency can be improved especially when the output power is low (during light load) when the switching loss is large, and the overvoltage can be suppressed.

In an embodiment, the switching frequency $f_{sw}$ may range from 1.05 to 1.3 times the frequency $f_0$.

In an embodiment, the switching frequency $f_{sw}$ may range from 1.1 to 1.2 times the frequency $f_0$.

In an embodiment, the controller circuit may be monolithically integrated on a single semiconductor substrate.

A series capacitor step-down converter according to an embodiment includes a main circuit of the series capacitor step-down converter and any of the controller circuits described above that drives switching elements included in the main circuit.

In an embodiment, the controller circuit may be monolithically integrated on a single semiconductor substrate. The term "monolithically integrated" means cases where all circuit components are formed on a semiconductor substrate and where the main components of a circuit are monolithically integrated, and some resistors, capacitors, or the like may be provided outside the semiconductor substrate for adjusting a circuit constant. By integrating the circuits on one chip, the circuit area can be reduced, and the characteristics of the circuit elements can be kept uniform.

Embodiment

Hereinafter, preferred embodiments will be described with reference to the drawings. The same or equivalent constituent elements, members, and processes illustrated in each drawing are denoted by the same reference signs, and duplication of description will be omitted as appropriate. Moreover, the embodiments are illustrative without limiting the disclosure, and all features or combinations thereof described in the embodiments are not necessarily essential to the disclosure.

In the present specification, "a state in which a member A is connected to a member B" includes a case in which the member A and the member B are indirectly connected to each other through other members that do not substantially affect the electrical connection state nor impair the functions and effects achieved by their combination, as well as a case in which the member A and the member B are physically and directly connected.

Similarly, "a state in which a member C is connected (provided) between a member A and a member B" includes a case where the members are indirectly connected to each other through other members that do not substantially affect their electrical connection state nor impair the functions and effects achieved by their combination, as well as a case where the member A and the member C, or the member B and the member C are directly connected.

Further, in the present specification, reference signs attached to electric signals such as voltage signals and current signals, or circuit elements such as resistors, capacitors, inductors refer to voltage values, current values, or circuit constants (resistance values, capacitance values, inductance) thereof, respectively, as needed.

The vertical and horizontal axes of the waveform diagrams and time charts to be referred to in the present specification are enlarged or reduced as appropriate for ease of understanding, and each illustrated waveform is also simplified, exaggerated, or emphasized for ease of understanding.

Figure 1:
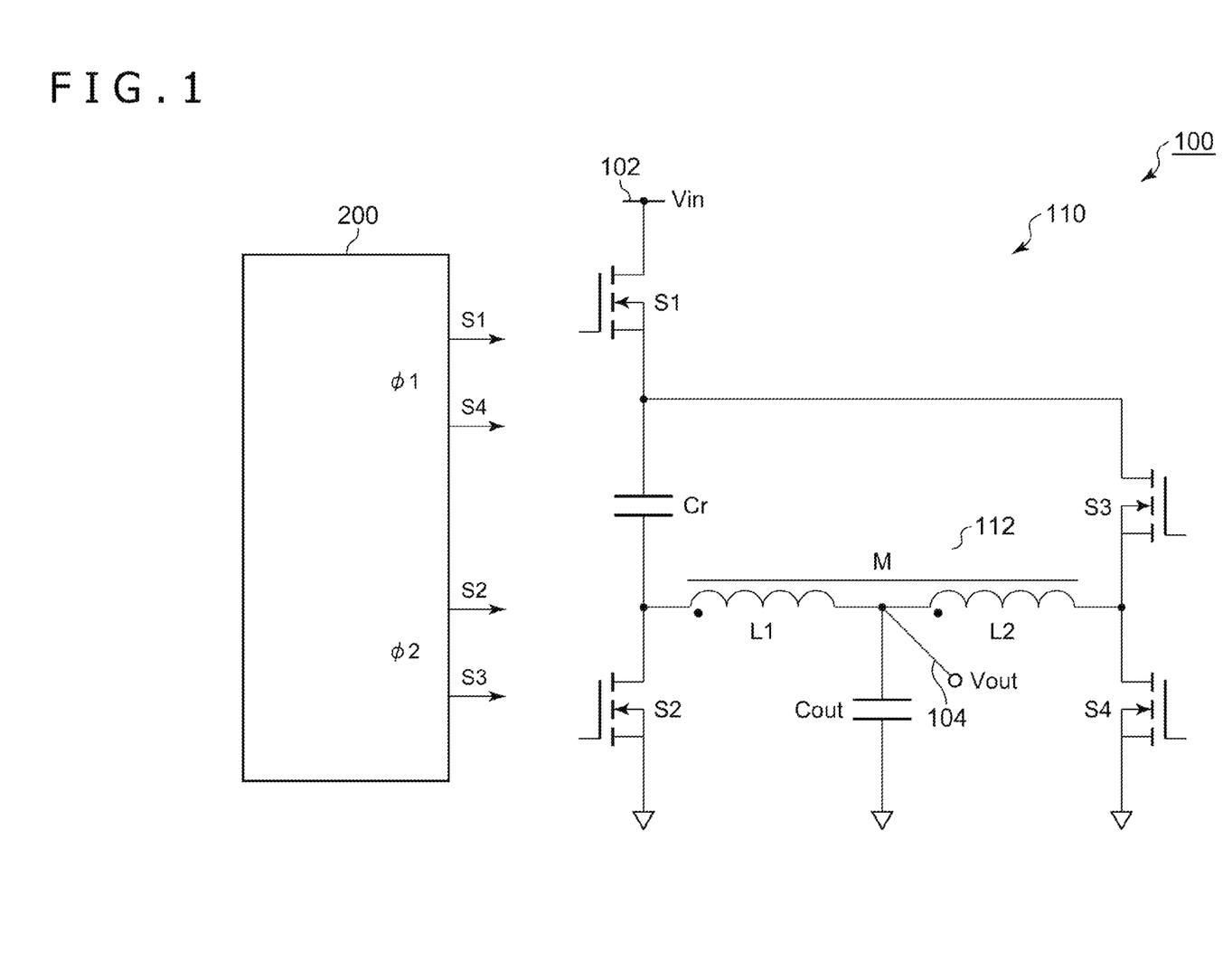
FIG. 1 is a circuit diagram of a series capacitor step-down converter according to an embodiment.

FIG. 1 is a circuit diagram of a series capacitor step-down converter 100 according to an embodiment. The series capacitor step-down converter 100 steps down an input voltage Vin supplied to an input line 102 and generates a stepped-down output voltage Vout on an output line 104.

The series capacitor step-down converter 100 includes a main circuit 110 and a controller integrated circuit (IC) 200. The controller IC 200 is an application specific integrated circuit (ASIC) integrated on one semiconductor substrate.

The main circuit 110 includes a first switch S1 to a fourth switch S4, a coupled inductor 112, a series capacitor Cr, and an output capacitor Cout.

The first switch S1 has a first end connected to the input line 102. The coupled inductor 112 is a transformer and includes a first inductor L1 and a second inductor L2 that are magnetically coupled. The first inductor L1 and the second inductor L2 have equal inductance L, and further have mutual inductance M. A first end of each of the first inductor L1 and the second inductor L2 is connected between the output line 104 and ground.

The second switch S2 is connected between a second end of the first inductor L1 and ground. The series capacitor Cr is connected between a second end of the first switch S1 and the second end of the first inductor L1. The third switch S3 is connected between the second end of the first switch S1 and a second end of the second inductor L2. The fourth switch S4 is connected between the second end of the second inductor L2 and ground. The output capacitor Cout is connected to the output line 104.

In this example, the first switch S1 to the fourth switch S4 are all illustrated as N-channel metal-oxide-semiconductor field-effect transistors (MOSFETs), but are not limited thereto, and other transistors may be used. Also, the second switch S2 and the fourth switch S4 on the low side may be rectifying elements such as diodes.

The controller IC 200 controls the first switch S1 to the fourth switch S4 to generate the output voltage Vout on the output line 104. To be specific, the controller IC 200 alternately repeats a first state $\varphi 1$ and a second state $\varphi 2$ at a predetermined switching frequency $f_{sw}$ with a dead time $T_D$ interposed therebetween.

First state $\varphi 1$:
First switch S1=ON
Second switch S2=OFF
Third switch S3=OFF
Fourth switch S4=ON
Second state $\varphi 2$:
First switch S1=OFF
Second switch S2=ON
Third switch S3=ON
Fourth switch S4=OFF
Dead time $T_D$:
First switch S1=OFF
Second switch S2=OFF
Third switch S3=OFF
Fourth switch S4=OFF When the length of each of the first state $\varphi 1$ and the second state $\varphi 2$ is $T_{ON}$, the switching frequency $f_{sw}$ is $1/(2 \times T_{ON})$. In other words, operating at the switching frequency $f_{sw}$ means repeating the first state $\varphi 1$ and the second state $\varphi 2$ at intervals of $T_{ON}=1/(2 \times f_{sw})$.

The abovementioned configuration is the configuration of the series capacitor step-down converter 100. Next, the operation thereof will be described.

Figure 2:
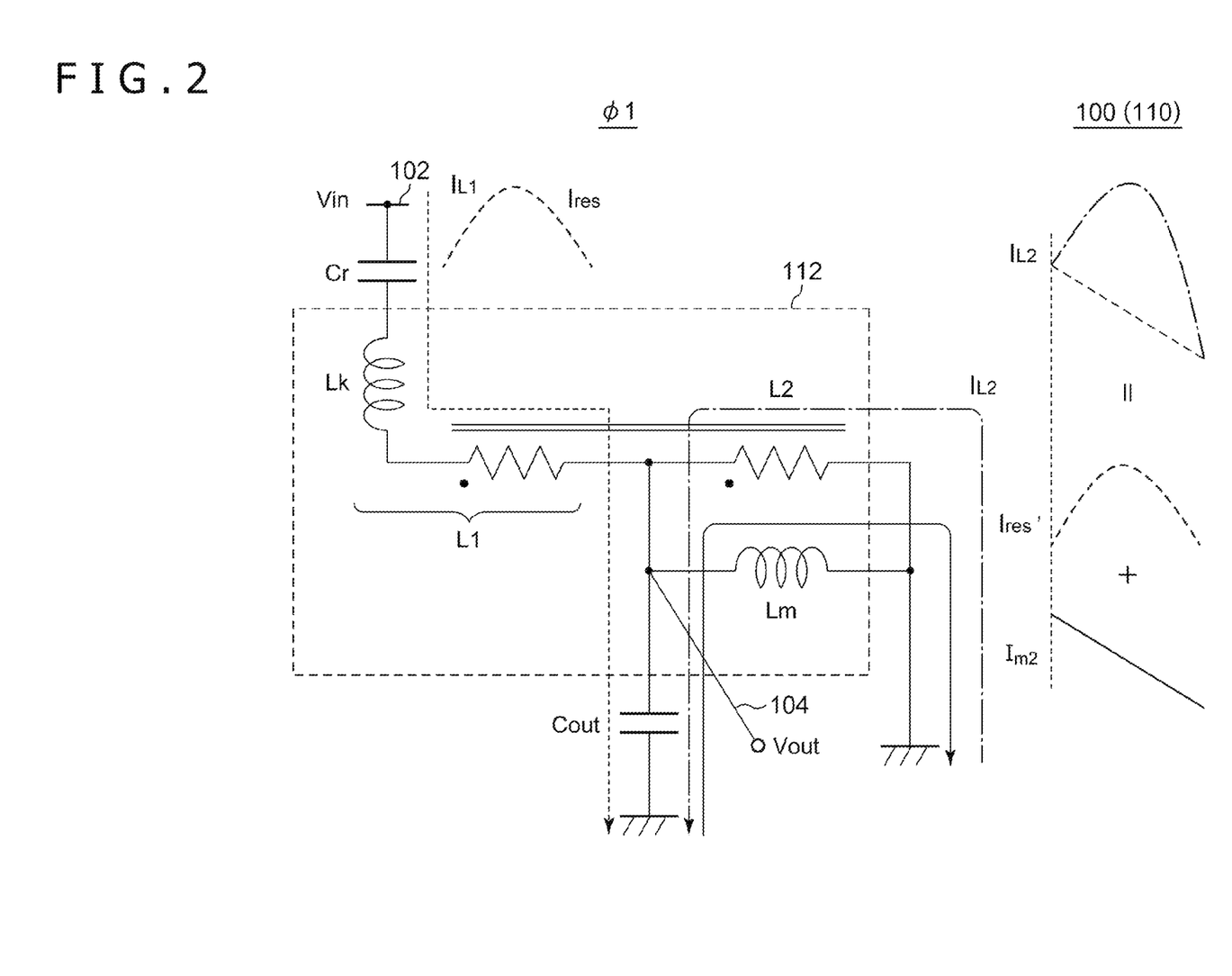
FIG. 2 is an equivalent circuit diagram of the series capacitor step-down converter (main circuit) in a first state φ1.

FIG. 2 is an equivalent circuit diagram of the series capacitor step-down converter 100 (main circuit 110) in the first state $\varphi 1$. The switches S1 and S4 in the on-state are illustrated as simple wirings. The coupled inductor 112 is illustrated as an equivalent circuit including an exciting inductance Lm and a leakage inductance Lk. A current flowing through the first inductor L1 is referred to as a first coil current $I_{L1}$, and a current flowing through the second inductor L2 is referred to as a second coil current $I_{L2}$.

In the first state $\varphi 1$, the series capacitor Cr, the first inductor L1 (leakage inductance Lk), and the output capacitor Cout form a series resonance circuit, and a resonance current Ires flows through the first inductor L1 ($I_{L1}$=Ires). Since the total current of the resonance current Ires', which is a replica of the resonance current Ires flowing through the first inductor L1, and the exciting current $Im_2$ flowing through the exciting inductance Lm flows through the second inductor L2, the second coil current $I_{L2}$ satisfies $I_{L2}$=Ires'+$Im_2$.

Figure 3:
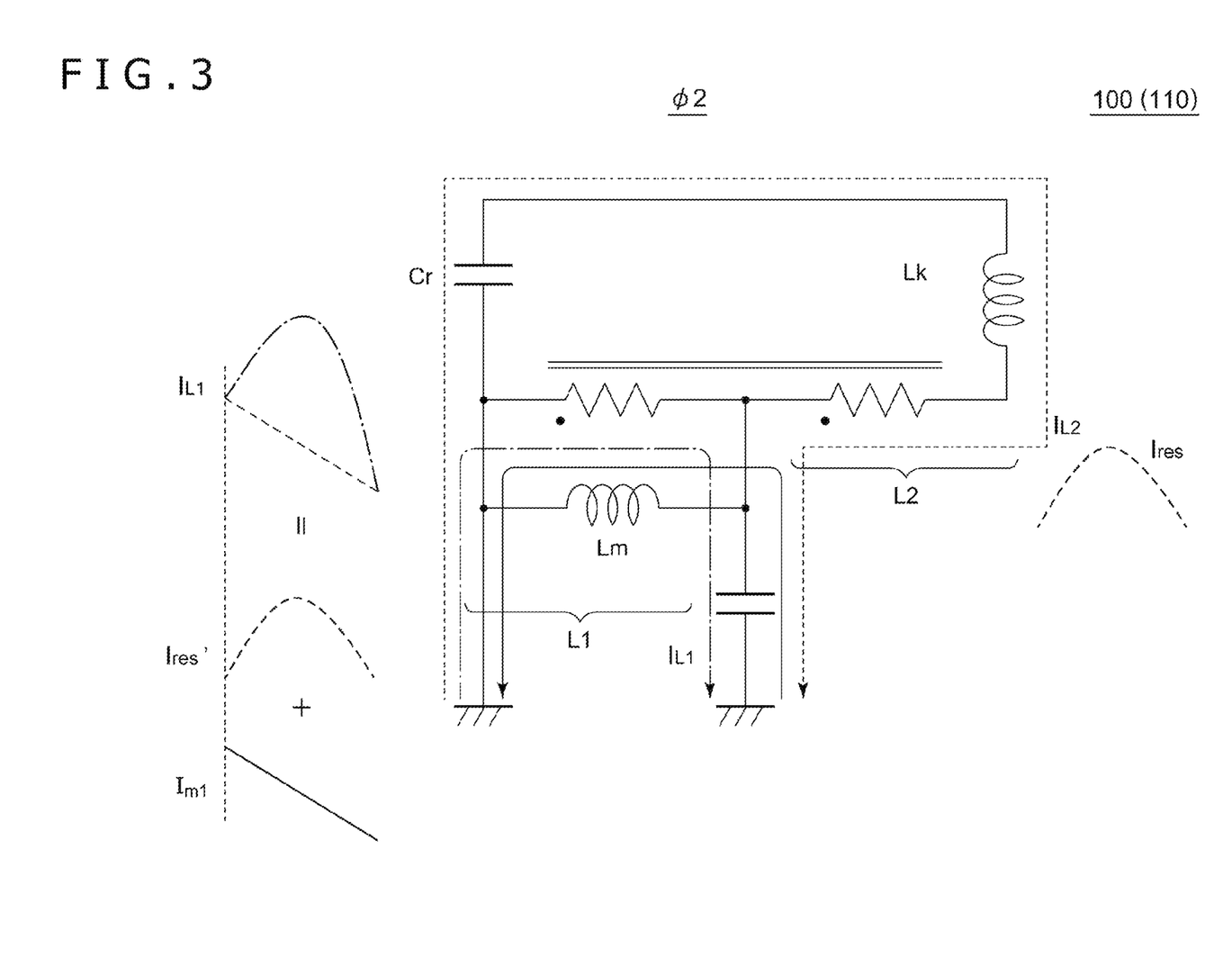
FIG. 3 is an equivalent circuit diagram of the series capacitor step-down converter (main circuit) in a second state φ2.

FIG. 3 is an equivalent circuit diagram of the series capacitor step-down converter 100 (main circuit 110) in the second state $\varphi 2$. The switches S2 and S3 in the on-state are illustrated as simple wirings.

In the second state $\varphi 2$, the series capacitor Cr, the leakage inductance Lk, and the output capacitor Cout form a series resonance circuit, and the resonance current Ires flows through the second inductor L2 ($I_{L2}$=Ires). Since the total current of the resonance current Ires', which is a replica of the resonance current Ires flowing through the second inductor L2, and an exciting current $Im_1$ flowing through the exciting inductance Lm flows through the first inductor L1, the first coil current $I_{L1}$ satisfies $I_{L1}=Ires'+Im_1$.

When the first state φ1 and the second state φ2 are alternately repeated, the voltage across the series capacitor Cr becomes Vin/2 in the steady state, and the remaining Vin/2 is applied to the coupled inductor 112. When the inductances of the first inductor L1 and the second inductor L2 are equal, an output voltage Vout that is ¼ times Vin is generated on the output line 104.

The conditions for the series capacitor step-down converter 100 to perform ZVS are as follows.

Transition from the first state φ1 to the second state φ2

During the dead time $T_D$ immediately after the first state φ1, when $I_{L1}$0 is satisfied, the current $I_{L1}$ flows through the body diode of the second switch S2, and the voltage across the second switch S2 decreases. At this time, when the state is changed to the second state φ2, that is, when the second switch S2 is turned on, the ZVS of the second switch S2 is established. It should be noted that the direction toward the output line 104 for the currents $I_{L1}$ and $I_{L2}$ is regarded as the positive direction.

Further during the dead time $T_D$, when $I_{L2}$<0 is satisfied, the voltage at the connection node between the third switch S3 and the fourth switch S4 increases due to the regenerative current, and the voltage across the third switch S3 decreases. At this time, when the state is changed to the second state φ2, that is, when the third switch S3 is turned on, the ZVS of the third switch S3 is established.

Transition from the second state φ2 to the first state φ1

During the dead time $T_D$ immediately after the second state φ2, when $I_{L1}$<0 is satisfied, the voltage at the connection node between the first switch S1 and the second switch S2 increases due to the regenerative current, and the voltage across the first switch S1 decreases. At this time, when the state is changed to the first state φ1, that is, when the first switch S1 is turned on, the ZVS of the first switch S1 is established.

Further, during the dead time, when $I_{L2}$≥0 is satisfied, the current $I_{L2}$ flows through the body diode of the fourth switch S4, and the voltage across the fourth switch S4 is small. At this time, when the state is changed to the first state φ1, that is, when the fourth switch S4 is turned on, the ZVS of the fourth switch S4 is established.

Figure 4:
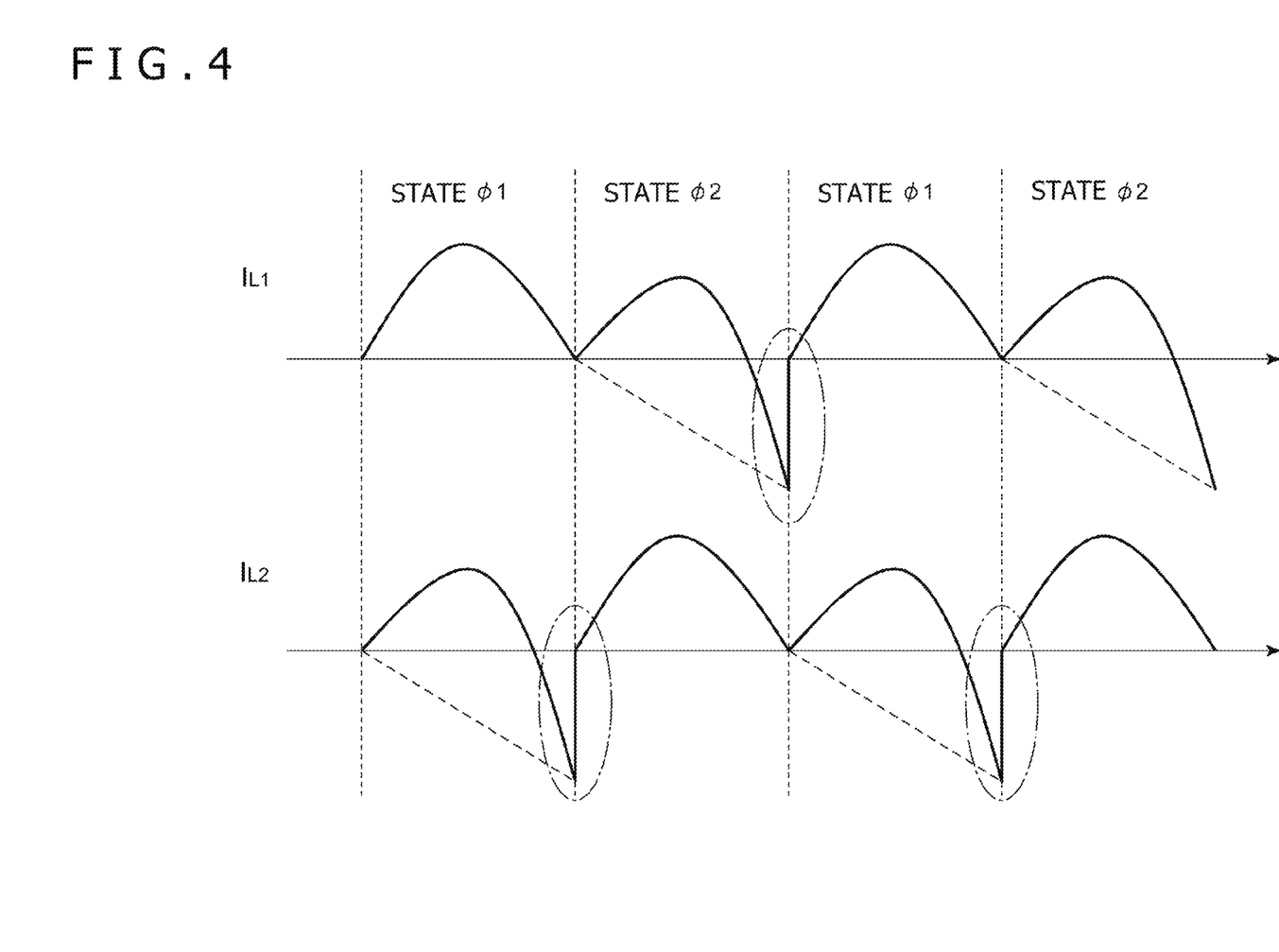
FIG. 4 is a current waveform diagram of the series capacitor step-down converter.

FIG. 4 is a current waveform diagram of the series capacitor step-down converter 100. A switching frequency $f_{sw}$ agrees with the resonance frequency $f_r$ of the main circuit 110, and the first state φ1 and the second state φ2 transition at the timing when the resonance current Ires becomes zero. The dead time is omitted here. FIG. 4 illustrates current waveforms when the first switch S1 to the fourth switch S4 are assumed to be ideal switches, namely, when the first switch S1 to the fourth switch S4 do not include parasitic capacitance.

At the timing of the end of the first state φ1, since the current $I_{L1}$ of the first inductor L1 is positive or zero ($I_{L1}$>0), and the current $I_{L2}$ of the second inductor L2 is negative ($I_{L2}$<0), the ZVS conditions mentioned above is satisfied.

Similarly, at the timing of the end of the second state φ2, the current $I_{L1}$ through the first inductor L1 is negative ($I_{L1}$<0) and the current $I_{L2}$ through the second inductor L2 is positive or zero ($I_{L2}$≥0), so that the ZVS conditions mentioned above is satisfied.

Thus, the series capacitor step-down converter 100 can satisfy the ZVS conditions by switching at the resonance frequency $f_r$, and can operate with high efficiency.

Figure 5:
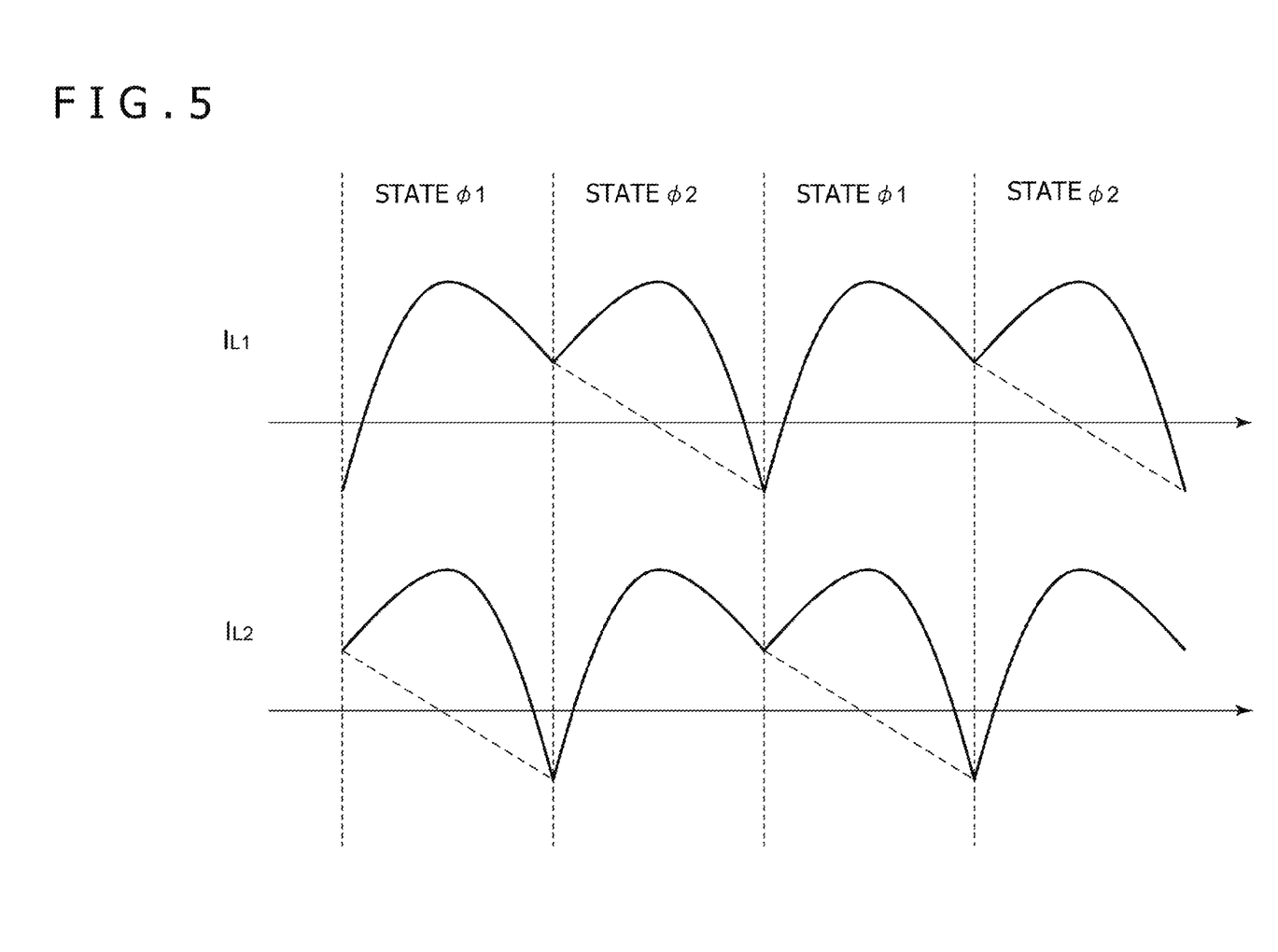
FIG. 5 is a current waveform diagram of the series capacitor step-down converter.

FIG. 5 is a current waveform diagram of the series capacitor step-down converter 100. Although FIG. 4 illustrates waveforms ignoring the parasitic capacitance of the MOSFET, the parasitic capacitance actually exists. This parasitic capacitance suppresses current discontinuity across the dead time. The coil currents $I_{L1}$ and $I_{L2}$ become continuous and have a waveform that is symmetrical on the time axis with respect to the dead time in the first state φ1 and the second state φ2.

Figure 6:
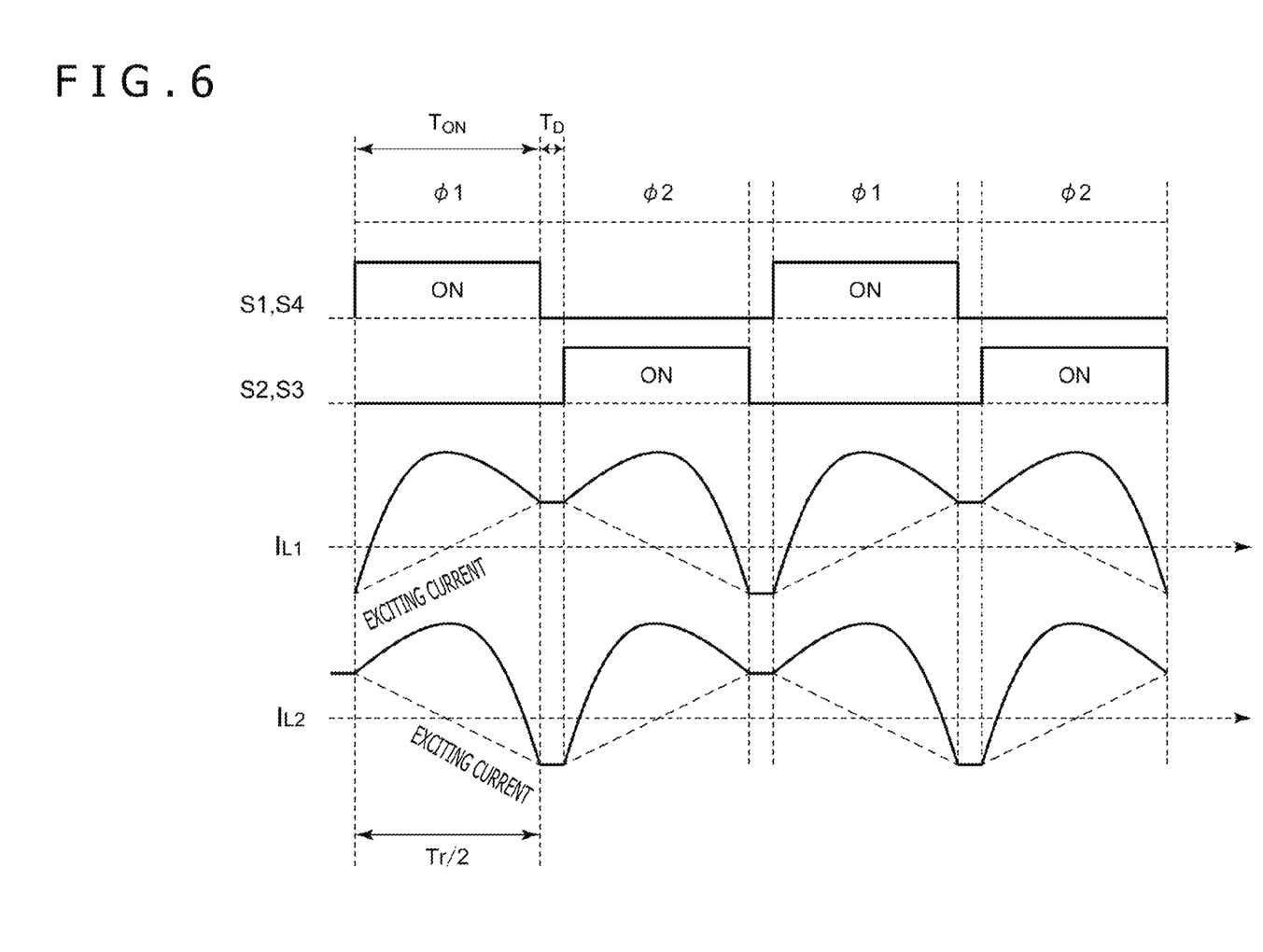
FIG. 6 is a time chart illustrating the operation of the series capacitor step-down converter in consideration of dead time.

FIG. 6 is a time chart illustrating the operation of the series capacitor step-down converter 100 in consideration of dead time. The length $T_{ON}$ of each of the first state φ1 and the second state φ2 is half of a resonance period $T_r$ (=1/$f_r$).

A resonance frequency $f_{r1}$ in the first state φ1 of the main circuit 110 is represented by Equation (2).

[Math. 2]

$$f_{r1} = \frac{1}{2\pi}\sqrt{\frac{L_2}{C_r(L_1 L_2 - M^2)}} \quad (2)$$

Similarly, a resonance frequency $f_{r2}$ in the second state φ2 of the main circuit 110 is represented by Equation (3).

[Math. 3]

$$f_{r2} = \frac{1}{2\pi}\sqrt{\frac{L_1}{C_r(L_1 L_2 - M^2)}} \quad (3)$$

A situation satisfying $f_{r1}=f_{r2}$ is ideal, but since the main circuit 110 is mounted on a printed substrate, its resonance frequencies $f_{r1}$ and $f_{r2}$ are affected by parasitic capacitance and parasitic inductance, so that it is not easy to make the frequencies agree with each other perfectly. Further, among the components of the main circuit 110, inductors (transformers) and capacitors are mounted as chip components, and their circuit constants vary. Therefore, it is not easy to completely match (tune) the switching frequency with the resonance frequency for each series capacitor step-down converter 100.

When the switching frequency of the series capacitor step-down converter 100 is made to agree with the design value of the resonance frequency of the main circuit 110, depending on the combination of variations in circuit constants, a situation occurs in which the switching frequency may become lower than the resonance frequency, in other words, the on-time $T_{ON}$ in the first state φ1 and the second state φ2 is longer than half the resonance time (resonance half-cycle) Tr/2.

Referring to FIG. 6, if $T_{ON}$ is too long compared to the resonance half-cycle Tr/2, the first coil current $I_{L1}$ becomes a negative current at the timing of transition from the first state φ1 to the second state φ2, and thus the ZVS conditions are not satisfied.

Figure 7:
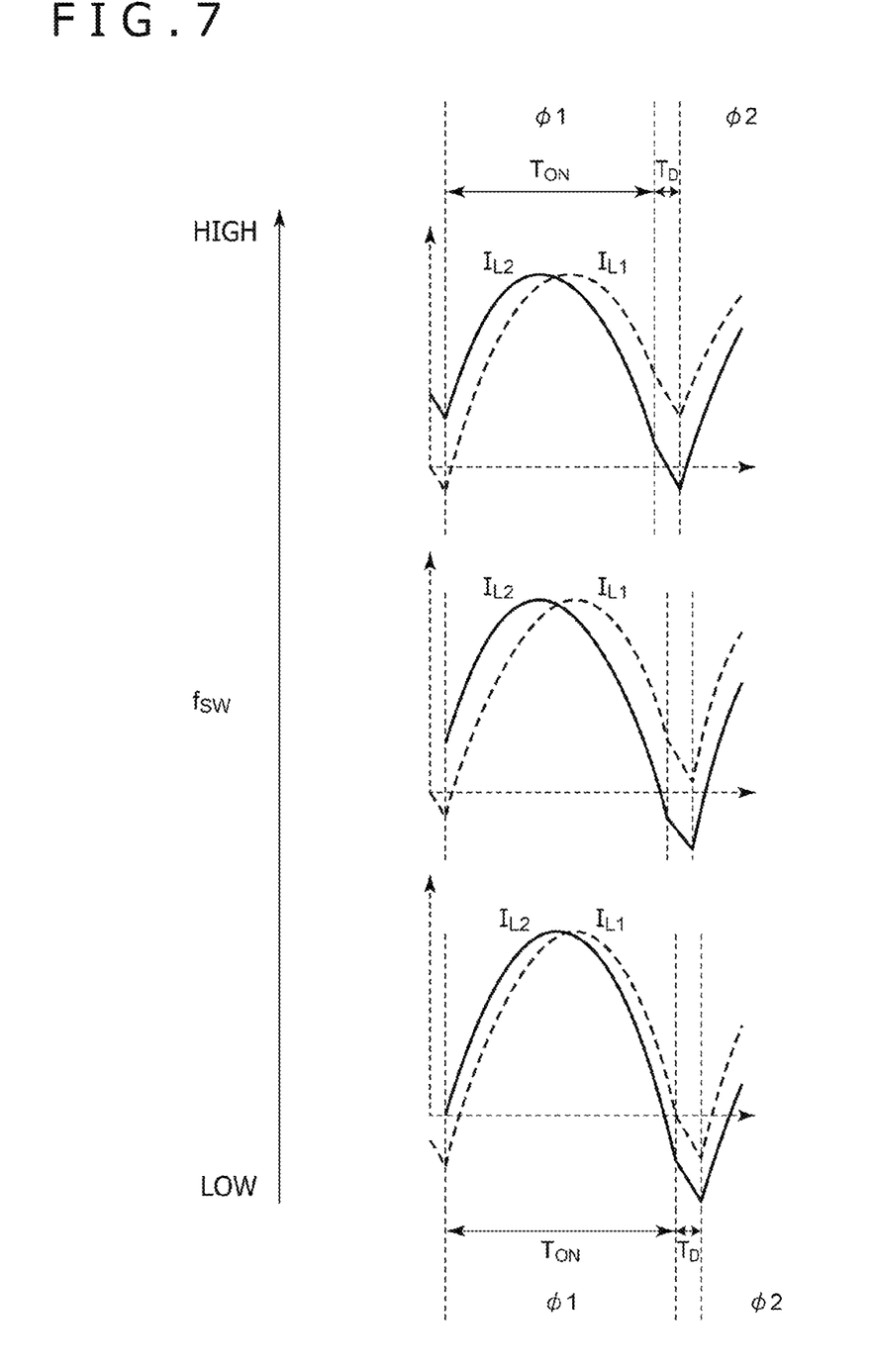
FIG. 7 is a diagram illustrating current waveforms when a switching frequency $f_{sw}$ is changed.

FIG. 7 is a diagram illustrating current waveforms when the switching frequency f sw is changed. When the switching frequency $f_{sw}$ is low (the bottom in the figure), in other words, when the on-time $T_{ON}$ is long, the current $I_{L1}$ of the first inductor L1 becomes a negative current at the timing of transition to the dead time $T_D$. Since the current $I_{L1}$ further decreases during the dead time $T_D$, $I_{L1}$≥0 does not hold regardless of whether the dead time ID is lengthened or shortened, and the ZVS conditions cannot be satisfied, resulting in poor efficiency.

On the other hand, when the switching frequency $f_{sw}$ is high (the top in the figure), in other words, when the on-time $T_{ON}$ becomes short, the current $I_{L1}$ of the first inductor L1 and the current $I_{L2}$ of the second inductor L2 will both be positive at the timing of transition to the dead time $T_D$. In this case, by lengthening the dead time $T_D$, a state of $I_{L1}>0$ and $I_{L2}<0$ can be created, and the ZVS conditions can be satisfied.

In the present embodiment, by utilizing this property, the switching frequency $f_{sw}$ is set high in advance so that the switching frequency $f_{sw}$ is higher than the resonance frequency $f_r$ even when the resonance frequency $f_r$ is lowered. The length of the dead time $T_D$ should be determined so as to satisfy the ZVS conditions when the resonance frequency $f_r$ takes the lowest value in the assumed range.

To be specific, the switching frequency $f_{sw}$ is set higher than the frequency $f_0$ determined by Equation (4).

[Math. 4]

$$f_0 = \frac{1}{2\pi}\sqrt{\frac{L}{C_r(L^2 - M^2)}} \quad (4)$$

L is the design value of the inductance of the first inductor L1 and the second inductor L2, M is the design value of the mutual inductance of the first inductor L1 and the second inductor L2, and Cr is the design value of the capacitance of the series capacitor.

For example, the switching frequency $f_{sw}$ may range from 1.05 to 1.3 times the frequency $f_0$. More preferably, the switching frequency $f_{sw}$ can be set within a range of 1.1 to 1.2 times the frequency $f_0$. Within this range, even if the resonance frequency varies, the ZVS conditions can be satisfied with a realistic dead time $T_D$.

Figure 8:
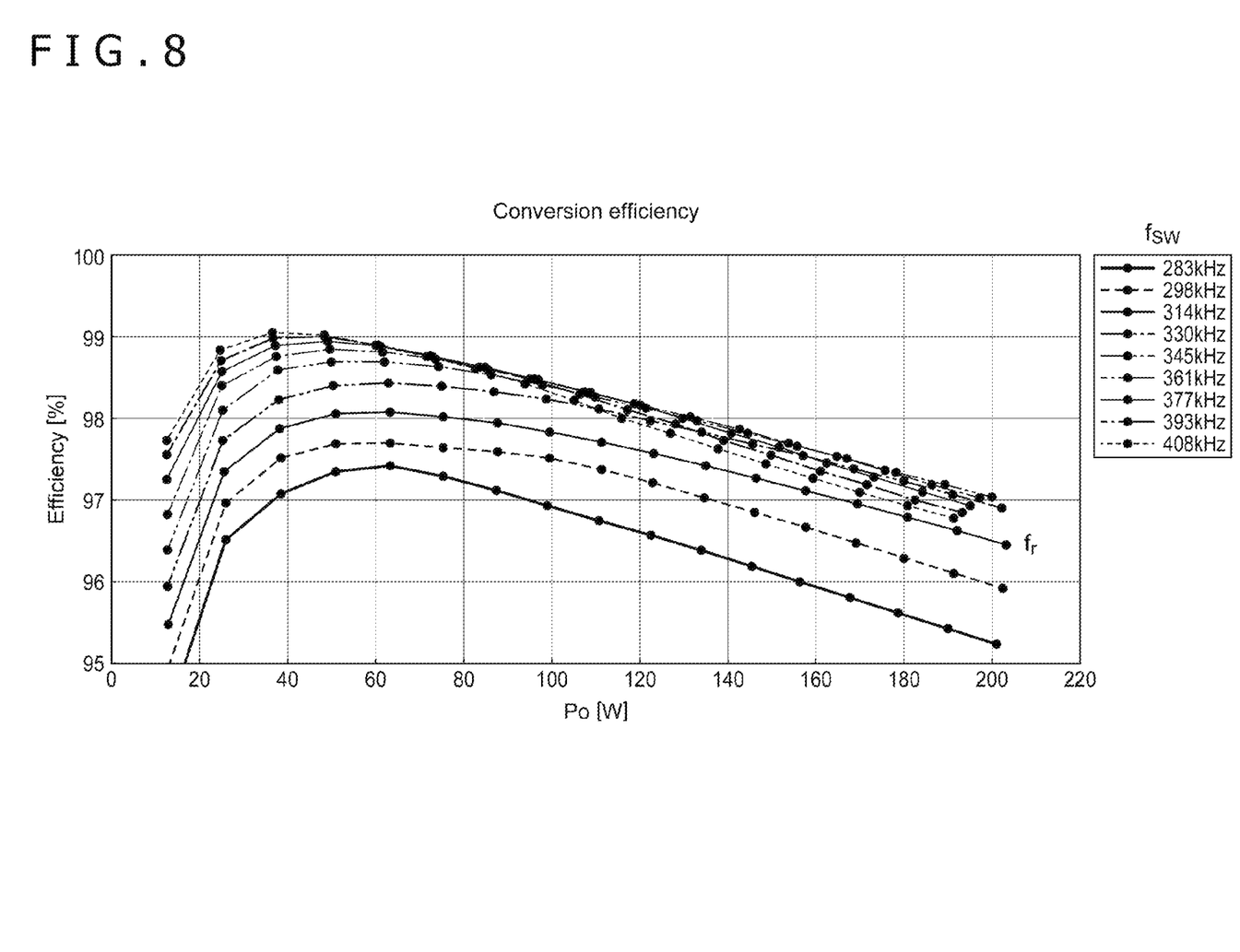
FIG. 8 is a diagram illustrating a power conversion efficiency of the series capacitor step-down converter.

FIG. 8 is a diagram illustrating the power conversion efficiency of the series capacitor step-down converter 100. The horizontal axis indicates output power, and the vertical axis indicates conversion efficiency. The resonance frequency is 314 kHz, and the efficiency is plotted when the switching frequency $f_{sw}$ is changed.

In a region where the output power Po is small, the efficiency can be further improved by making the switching frequency f sw higher than the resonance frequency.

(Application)

Figure 9:
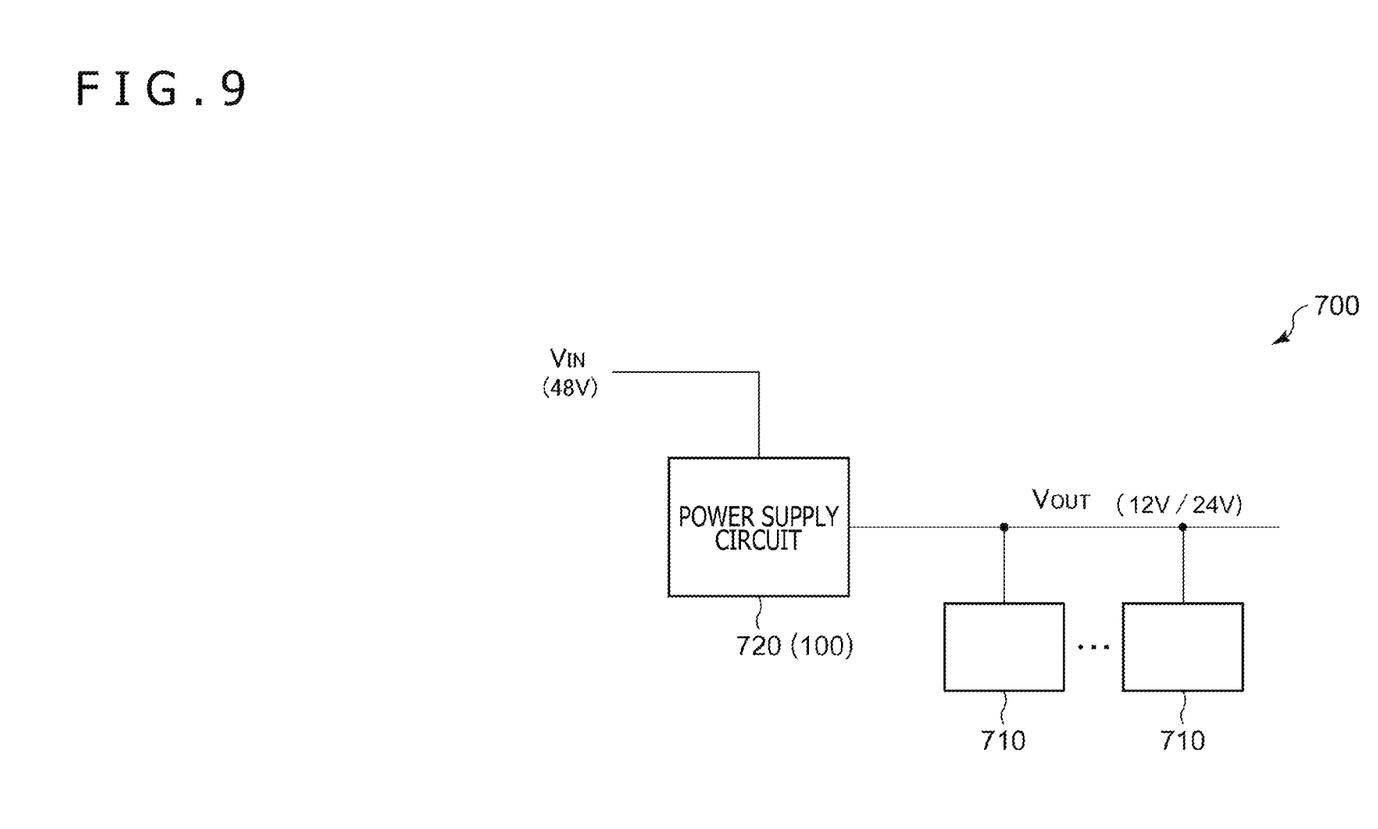
FIG. 9 is a diagram illustrating an example of an electronic device including the series capacitor step-down converter.

FIG. 9 is a diagram illustrating an example of an electronic device 700 including the series capacitor step-down converter 100. A suitable example of the electronic device 700 is a server. Since a 12 V power supply line is originally drawn into the server, an internal circuit 710 is designed to operate at 12 V. The internal circuit 710 can include a central processing unit (CPU), a memory, a local area network (LAN) interface circuit, a DC/DC converter that steps down a voltage of 12 V, and the like.

In recent years, there has been a movement to replace the bus voltage from 12 V to 48 V in order to reduce the current flowing through the wires. In this case, a power supply circuit 720 for stepping down the power supply voltage of 48 V to 12 V is required. The above-described series capacitor step-down converter 100 with ¼ gain can be suitably used for such a power supply circuit 720.

The electronic device 700 is not limited to a server and may be an in-vehicle device. Automobile batteries in the past are for mainly 12 V or 24 V, but for hybrid vehicles, there are cases where a 48 V system may be adopted, and also in this case, a power supply circuit that converts the battery voltage from 48 V to 12 V is required. In such a case, the series capacitor step-down converter 100 with ¼ gain can be preferably used.

In addition, the electronic device 700 may be industrial equipment, office automation (OA) equipment, or consumer equipment such as audio equipment.

The embodiments are examples, and it is understood by those skilled in the art that there are various modifications in the combination of respective components and processing processes, and such modifications are also included in the present disclosure and can constitute the scope of the present disclosure.

According to certain aspects of the present disclosure, power conversion efficiency can be improved.

What is claimed is:

1. A controller circuit for a series capacitor step-down converter that drives a plurality of switching elements of the series capacitor step-down converter at a switching frequency $f_{sw}$ higher than a frequency $f_0$ represented by the following Equation $$f_0 = \frac{1}{2\pi}\sqrt{\frac{L}{C_r(L^2 - M^2)}}$$

wherein
   L is a design value for an inductance value of each inductor of at least two inductors constituting a coupled inductor of the series capacitor step-down converter,
   M is a design value for a mutual inductance of the at least two inductors, and
   $C_r$ is a design value of a capacitance of a series capacitor of the series capacitor step-down converter.

2. The controller circuit according to claim 1, wherein the switching frequency $f_{sw}$ is in a range of 1.05 to 1.3 times the frequency $f_0$.

3. The controller circuit according to claim 1, wherein the switching frequency $f_{sw}$ is in a range of 1.1 to 1.2 times the frequency $f_0$.

4. The controller circuit according to claim 1, wherein the controller circuit is monolithically integrated on one semiconductor substrate.

5. A series capacitor step-down converter comprising:
   a main circuit of the series capacitor step-down converter; and
   the controller circuit according to claim 1 wherein
      the main circuit includes the plurality of switching elements.

6. A method for controlling a series capacitor step-down converter, the series capacitor step-down converter including
   an input line and an output line,
   a first switch having a first end and a second end, wherein the first end of the first switch is connected to the input line,
   a coupled inductor including a first inductor and a second inductor which are coupled with each other with a mutual inductance design value of M, wherein
      each of the first inductor and the second inductor has a first end and a second end, and
      the first end of each of the first inductor and the second inductor is connected to the output line,
   a second switch connected between the second end of the first inductor and ground,
   a series capacitor connected between the second end of the first switch and the second end of the first inductor, a third switch connected between the second end of the first switch and the second end of the second inductor, a fourth switch connected between the second end of the second inductor and ground, and an output capacitor connected to the output line, the method comprising:

defining a switching frequency $f_{sw}$ higher than a frequency $f_0$ represented by the following Equation $$f_0 = \frac{1}{2\pi}\sqrt{\frac{L}{C_r(L^2 - M^2)}}$$

wherein

L is a design value for an inductance value for each of the first inductor and the second inductor, M is the mutual inductance design value for a mutual inductance of the first inductor and the second inductor, and $C_r$ is a design value of a capacitance of the series capacitor; and repeating a first state in which the first switch and the fourth switch are on and a second state in which the second switch and the third switch are on, which have same duration, at the switching frequency $f_{sw}$.

7. The method for controlling according to claim 6, wherein the switching frequency $f_{sw}$ is in a range of 1.05 to 1.3 times the frequency $f_0$.

8. The method for controlling according to claim 6, wherein the switching frequency $f_{sw}$ is in a range of 1.1 to 1.2 times the frequency $f_0$.

\* \* \* \* \*